United States Patent Office 3,698,882
Patented Oct. 17, 1972

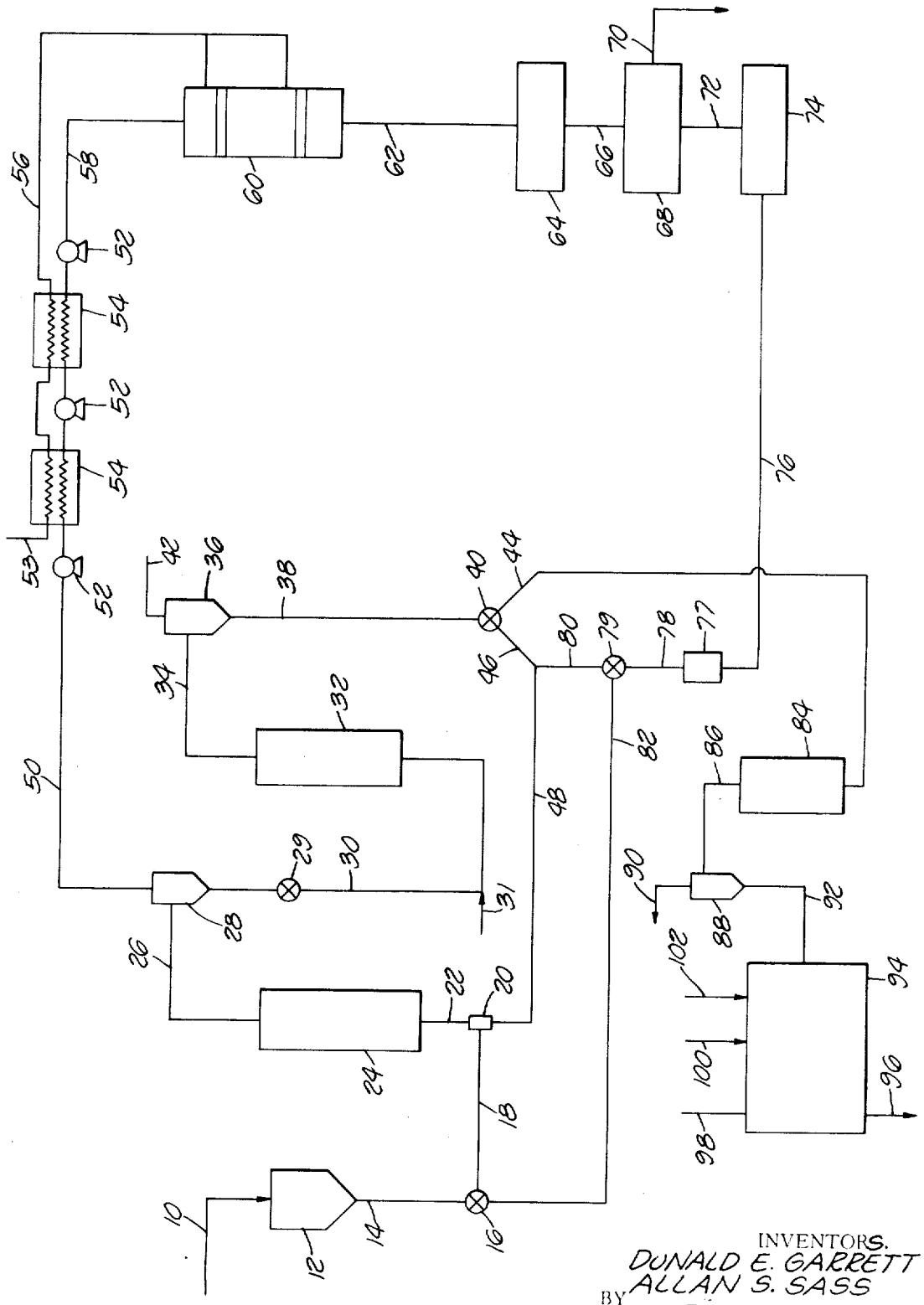

3,698,882
CONTINUOUS PROCESS FOR THE CONVERSION OF CARBONACEOUS SOLIDS INTO PIPELINE GAS
Donald E. Garrett, Claremont, and Allan S. Sass, South Pasadena, Calif., assignors to Occidental Petroleum Corporation, Los Angeles, Calif.
Filed Sept. 30, 1970, Ser. No. 76,700
Int. Cl. C10j 3/00, 3/46
U.S. Cl. 48—210     12 Claims

ABSTRACT OF THE DISCLOSURE

Continuous process for converting particulate carbonaceous materials to pipeline gas by rapid pyrolysis and separation of the material into a volatilized hydrocarbon phase and a char solids phase followed by in-flight compression, heating and contacting of the volatilized hydrocarbons with hydrogen to effectuate the conversion, with the char being utilized as a raw materials source for the hydrogen.

BACKGROUND OF THE INVENTION

The art has long sought a continuous process for the conversion of carbonaceous materials such as coal and solid wastes containing organic material to pipeline gas. The effort stems in part from increased interest in the use of such gas as a raw material for the synthesis of chemicals and liquid fuels, and in part from the need to develop methods for gasifying coal and solid wastes containing organic matter to ensure a long range supply of energy in the form of gaseous fuel. Gasification of such materials yields a product that can be handled with maximum convenience and minimum cost, and in addition greatly extends the uses to which such solid fuel sources may be put. Where solid wastes containng organic matter are gasified, there are the added ecological advantages of disposal of the wastes; by recycling them for use in the energy cycle thus adding to the total resources available.

In conventional processes for the conversion of carbonaceous materials such as coal to pipeline gas, a single reactor vessel is employed for the required conversion with the coal being pyrolyzed at high temperatures to cause it to release its volatilized hydrocarbons as a vapor within the vessel and these vapors are contacted with hydrogen while maintaining the reactants under high pressure and high temperature within the pyroylsis vessel to convert the volatilized hydrocarbons contained therein to pipeline gas. This sytem requires the use of lock hoppers to feed coal into the reactor vessel and to remove solids from the vessel. The use of such hoppers greatly increases the cost of such systems. Further, carbonaceous material which has agglomerative tendencies must be pretreated prior to being hydrogasified in order to prevent coking during the hydrogasification step.

The art has long sought a continuous flow process for the conversion of solid carbonaceous materials to pipeline gas without the necessity of passing solid materials through pressure differentials. It is the object of the invention to provide an efficient economical method of converting solid carbonaceous materials to pipeline gas.

SUMMARY OF THE INVENTION

This invention discloses an efficient economical method for producing pipeline gas from solid carbonaceous materials comprising comminuting the carbonaceous material until the particle size of said carbonaceous material has a maximum particulate dimension of less than 1.0 inch; forming a turbulent high velocity gaseous stream composed of inert carrier gas, the particulate carbonaceous solids and particulate char such that the carbonaceous solids and char are intimately admixed and entrained within the gaseous portion of the stream; heating the carbonaceous material in said stream to a temperature ranging from between about 600° F. to about 1500° F. in a pyrolysis zone, the residence time of said solids in said zone being less than 1.0 minute; separating the gaseous products and solids from said heated stream, said gaseous products containing volatilized hydrocarbons; compressing said gaseous products in flight to a pressure ranging from about 500 to about 1500 p.s.i.a.; heating the compressed gaseous products to a temperature ranging from between about 800° F. to about 1400° F.; contacting the heated gaseous products with hydrogen to methanate the volatilized hydrocarbons contained in the gaseous hydrocarbons, thereafter recovering the pipeline gas. In a preferred embodiment of this invention, the particulate solids emerging from the pyrolysis zone are used both as a source of char for the pyrolysis portion of the process and as a source of hydrogen for the methanation of the volatilized hydrocarbons produced upon pyrolysis of the carbonaceous solids with hydrogen being obtained from the pyrolyzed char by sequentially heating the char to a temperature ranging from about 1200° F. to about 1800° F. in order to degasify the char and produce a hydrogen rich gas stream. Thereafter the degasified char is heated to a temperature ranging from about 1500° F. to about 2500° F. and the heated char is contacted with water to produce a hydrogen rich gas stream which can be utilized to methanate the volatilized hydrocarbon.

DETAILED DESCRIPTION OF PREFERRED EMBODIMENTS

This invention is concerned with the production of pipeline gas for use as a source of fuel and/or as a raw material in chemical processing. Such gas is composed primarily of methane and can contain other gaseous hydrocarbons; i.e., ethane, propane, butane, etc. which do not interfere with its intended use. The gas produced by our novel process can be treated by conventional processes to remove any undesirable impurities which are deemed undesirable, i.e., sulfur compounds, carbon dioxide, carbon monoxide, etc.

By the term compression in flight is meant that the gaseous products produced upon pyrolysis of the carbonaceous materials are maintained in the gaseous state while they are further treated in our novel process to produce pipeline gas.

In effect our process is a two-stage process, in the first stage the volatilized hydrocarbons are extracted from carbonaceous solids by continuous rapid pyrolysis of the solids in a pyrolysis zone and in the second stage the volatilized hydrocarbons are contacted with hydrogen to convert the volatilized hydrocarbons to pipeline gas. In a preferred embodiment of our process a third stage is employed wherein we utilize a portion of the pyrolyzed solids recovered from the pyrolysis zone as a source of char and as a source of hydrogen.

The pyrolysis stage of our invention can be carried out by any continuous pyrolysis unit which will pyrolyse solid particulate carbonaceous materials to extract the volatilized hydrocarbons into a gaseous stream from carbonaceous materials. Such processes are well known to those skilled in the art. Exemplary of the type pyrolysis process which can be utilized in the practice of our invention are shown in U.S. Pat. No. 2,608,526, entitled "Coking of Carbonaceous Fuels," issued to W. A. Rex on Aug. 26, 1952. U.S. patent application Ser. No. 57,592, entitled "A Process for the Treatment of Coal," applied for by A. Sass, C. S. Finney, H. McCarthy and P. Kaufman, filed in the U.S. Patent Office on July 23, 1970 and U.S. patent application Ser. No. 61,669 entitled "Pyrolysis Process for Solid Wastes," applied for by D. Garrett and G. Mallan on Aug. 6, 1970. The patent to Rex describes a continuous process for pyrolysing coal and other particulate carbonaceous materials by forming a moving turbulent stream of said materials entrained in a carrier gas and passing said stream through a pyrolysis zone while heating the carbonaceous materials in the zone to cause the volatilizable hydrocarbon in the carbonaceous material to volatilize and become entrained in the carrier gas with subsequent separation of the gaseous phase and solids emerging from the reactor. The heat required by pyrolysis therein being capable of being provided, directly or indirectly to the materials in the stream by various methods including introducing and intermixing hot particulate char in the pyrolysis stream.

The processes disclosed in the two cited U.S. patent applications elaborate on the principles shown and disclosed in the Rex patent and permit the use of such processing to produce volatilized hydrocarbons from agglomerative type coal and mixtures of waste solids such as municipal wastes. The processes shown and disclosed in the cited U.S. patent to Rex and the two U.S. patent applications can be beneficially used to provide a source of volatilized hydrocarbons and char found useable in the practice of our invention and the teachings disclosed therein are incorporated herein.

The carrier gas employed in the pyrolysis zone should be selected with care to maximize the production of volatilized hydrocarbons and with the intent that it should cause minimal interference with the second stage of the process wherein the hydrocarbons are to be contacted with hydrogen to convert them to pipeline gas. The carrier gas should be non-reactive with the coal during pyrolysis. This gas stream should be substantially free of air, oxygen, water, carbon dioxide and the like as they have a deleterious effect upon the proportion of volatiles extracted from the carbonaceous materials during pyrolysis. Exemplary of gases suitable for use as a carrier gas in our invention are nitrogen, argon, methane, hydrogen, carbon monoxide, mixtures thereof and any other gas which will not deleteriously react with or oxidize the organic portion of the matter within the system.

In a preferred embodiment of our invention we use hydrogen as the carrier gas. The use of hydrogen as the pyrolysis gas aids in the second stage of our process wherein the hydrocarbons are contacted with hydrogen. It eliminates contamination of the gaseous stream which would have to be removed after the volatiles are converted into pipeline gas.

The design of a particulate system in which the process is to be utilized will of course have to conform to the process limits as heretofore stated in the summary of the invention. The process must be designed with flow rates that will produce the requisite turbulence and heating of the particulate carbonaceous materials. The heat required in pyrolysis can be readily provided by intermixing heated particulate char to raise the temperature of the carbonaceous solids which are being treated in the system. Such design parameters are well known to those skilled in the art.

In this invention we are treating carbonaceous materials which can be any solid carbonaceous materials containing organic matter such as coal, lignocellulose products and conventional solid wastes produced by our society. These wastes can be municipal solid wastes, containing the widest variety of ingredients, i.e., glass, metal, water, organic products such as paper, automobile tires, plastic, vegetative material, etc. The industrial waste may be rubber or plastic, agricultural waste, manure, cannery waste, etc. However, this invention is directed to the converesion of the volatile hydrocarbons contained in such materials which are removed from such carbonaceous materials and converted by our process into pipeline gas. Our novel process can employ conventional waste solids during the pyrolysis stage without prior segregation of the organic waste solids therefrom. In one embodiment of our invention we substantially remove inorganic materials from the waste solids and treat only that portion of the solids which is composed substantially of organic materials in the pyrolysis zone. The degree of segregation of organic solids from the original waste solid is optional since total segregation may impose added cost factors upon the process.

The solid phase and gaseous stream having the volatilized hydrocarbons entrained therein emerging from the pyrolysis zone of our process can be readily separated from each other by a conventional classification system, for example, a cyclone separator.

An exceptionally advantageous aspect of our invention is the fact that we do not have to provide for condensation and separation of the volatilized hydrocarbons from the carrier gas. When such volatilized hydrocarbons are condensed, polymerization and molecular condensation occurs, which requires that more rigorous temperature and pressure conditions be employed to effectuate converting these hydrocarbons to pipeline gas.

The gaseous portion, which has been separated from the effluent emerging from the pyrolysis zone is compressed by conventional gas compression techniques while maintaining the gases therein in the gas phase to a pressure ranging between about 500 to about 1500 p.s.i.a., and the compressed gases are heated to a temperature ranging from about 800° F. to about 1400° F. and are contacted with sufficient hydrogen to convert the hydrocarbons contained therein to pipeline gas.

In the second stage of our novel process wherein the condensed heated volatilized hydrocarbons are contacted with hydrogen, the hydrogen can be in the form of a mixture of gases containing molecular hydrogen and other gases. All that is required is that there be present in the contacting gas sufficient hydrogen to effectuate the desired conversion of the volatilized hydrocarbons to pipeline gas. Thus, synthesis gas containing hydrogen gas can be suitably employed.

Any contaminants which have been transported through the system with the gaseous stream such as carbon monoxide and carbon dioxide and $SO_2$ can be removed from the pipeline gas produced in the system by conventional scrubbing techniques. Indeed, the carbon monoxide can be removed from the system and converted to pipeline gas by conventional processing techniques such as those shown and disclosed in a report Number PB 176982 issued by the Office of Coal Research under Contract No. 14–01–0001–381 in October 1965 entitled "Process Design and Cost Estimate for Production of 265 Million s.c.f./day of Pipeline Gas by the Hydrogasification of Bituminous Coal." In that report there is shown a conventional method for the methanation of carbon monoxide and carbon dioxide. On pages 36, 37 and 38 of that report a conventional process for the production of hydrogen from the char produced in the pyrolysis portion of our invention is given. The teachings of that report are incorporated herein and made a part hereof. It discloses a process wherein the hydrogen required to convert the volatilized hydrocarbons to pipeline gas is produced having a high temperature and high pressure which is readily utilizeable in the practice of our invention. The hydrogen is produced by the partial combustion of the char to heat the char to create the carbon dioxide with subsequent contacting of the heated char with steam to cause a water gas shift to produce hydrogen. Such methods are well known to those skilled in the art. In the processes the char is generally heated to a temperature ranging from between about 1500° F. to about 2500° F. and contacted with steam at pressures from 300 to 600 p.s.i.a. to produce a mixture consisting primarily of CO, $CO_2$, and $H_2$. The $CO_2$ is removed, usually by a hot potassium carbonate solution and the CO is then shifted to $CO_2$ and $H_2$ by catalytically reacting the CO with steam at 500 to 700° F. at 200 to 400 p.s.i.a. to produce additional hydrogen.

The excess char particles produced by the pyrolysis portion of our invention can readily be degasified by heating them to temperatures ranging from about 1200° F. to 1800° F. to yield a hydrogen rich gas stream which stream is saleable as premium fuel or which can be upgraded to pure hydrogen or in a preferred embodiment of our invention used to provide at least a portion of the hydrogen which is required to convert the volatilized hydrocarbons to pipeline gas.

Char degasification can be carried out in several ways, which, in substance amounts to indirect or direct heating. In direct heating, the char is contacted with sufficient oxygen from a suitable source, such as air to bring the char by controlled combustion up to the desired degasification temperature. This can be done in a transport reactor similar to the pyrolysis reactor or in a fluidized bed. The char can be degasified by indirect heating which yields a gas stream containing 70 or more percent by volume hydrogen. This may be accomplished in a reactor similar to a tubular heat exchange in which char is blown through the tubes in a dense or dilute phase and fuel is burned with air or another suitable source of oxygen in adjacent tubes to supply the heat required for degasification. Alternatively, the same result can be accomplished by the combustion of the fuel in tubes located in a fluidized bed of the char. The degasified char can be utilized as the char portion in the pyrolysis stage of our invention and as excess char.

Any particulate carbonaceous material, such as coal, oil shale, or refuse waste solids is fed through line 10 into feed bin 12. It is withdrawn from the bin through feed pipe 14 and its flow rate into transport line 18 is controlled by valve 16. It is blown to a mixing T 20 by recycle gas from line 82. At valve mixing chamber 20, it is mixed with hot recycled char transported through line 48 by recycle gas. The mixture flows through line 22 into pyrolysis reactor 24 where the carbonaceous material is rapidly heated by the char to its decomposition temperature as it is blown at high velocity through the reactor. The pressure in the reactor does not exceed 10 p.s.i.a. Due to the extremely short reaction time, 0.1 to 3 seconds, the yield of volatile material is extremely high.

The reactor products consisting of gaseous products containing volatilized hydrocarbons and char solids products leave the reactor through line 26, and the solids are removed from the gas stream in device 28, which may be a cyclone, electrostatic precipitator or any other efficient gas solid separator. The carbonaceous residue, or char, from 28 whose feed rate is controlled by valve 29, drops into line 30. Here it is picked up by an air stream, which enters through line 31. The air and char mix and travel through heater 32 wherein the air partially oxidizes the char and elevates its temperature. The char temperature is controlled by the amount of air admitted through line 31. An alternate approach for heating the char is by indirect means, such as by utilizing a shell and tube heat exchanger. The char is blown through the tubes while a fuel is burned with air on the shell side of the exchanger.

The heated char leaves reactor 32 through line 34 and passes through a gas solid separator 36. 36 may be a cyclone, electrostatic precipitator or any other efficient gas solid separating device. The off gases are vented through line 42. The hot char passes through line 38 to the splitter valve 40. The first portion of the char exits through line 44. This char can be used as a source of fuel or activated carbon, or it preferably is further processed in accordance with the teachings of our invention as a source of the hydrogen needed later in the process. A second portion of the char flows into line 46 where it is picked up by recycle gas from line 80 and blown through line 48 to the mixing T 20 for intermixture with the carbonaceous materials in the pyrolysis portion of our invention.

The gases from separator 28, which are rich in condensable liquids, are passed through line 50 to compressors 52. The temperature of the gases in line 50 is controlled to prevent any condensation of materials. The gases are compressed from essentially atmospheric pressure to a pressure ranging from above about 500 to 1500 p.s.i.a. The number of compression stages needed is controlled by the final pressure desired and the need to prevent overheating of the gases, since this would result in cracking reactions and deposition of materials in the compressor. The maximum temperature reached during compression should not exceed about 1400° F. Although any fluid might be used for the interstage cooling it is advantageous to use the hydrogen which is needed later in the process as the cooling fluid. In this manner, some recovery of the compression energy is obtained.

The compressed and heated gases flow through line 58 into the hydrogenation reactor 60. The high pressure hydrogen needed for reaction, which has been heated in intercoolers 54, flows through line 56 into reactor 60. In this reactor, the tars evolved from the carbonaceous material react with hydrogen. The carbon is converted almost completely to methane, whereas the oxygen, nitrogen and sulfur in the gaseous tars are converted to water, ammonia and hydrogen sulfide respectively. Depending upon the quality of the evolved vapors, at one extreme it may be possible to conduct this conversion in a single stage non-catalytic reactor, whereas on the other extreme it may be necessary to employ a multi-bed catalytic reactor.

During hydrogenation and methanation of the volatile hydrocarbons in our invention, it is advantageous to carry out this portion of the process in the presence of conventional hydrogenation catalysts, i.e., sulfides of; cobalt-molybdenate oxides, tungsten oxides, nickel oxides, etc.

The reactor products leaving reactor 60 through line 62 are then processed for recovery of pipeline gas. In one possible approach, the gases are passed to the gas purification section 64, of the plant. Using conventional technology, water, hydrogen sulfide, carbon dioxide, ammonia and readily condensable liquids are then removed. The gas leaving through line 66 contains essentially only methane, ethane, hydrogen, carbon monoxide and traces of other hydrocarbons. This gas then enters unit 68 in which the pipeline gas is cryogenically recovered and pumped to storage through line 70. The non-condensed gases pass through line 72 into a methanator 74. In this reactor, the carbon monoxide which is formed during the pyrolysis and hydrogenation is reacted with hydrogen to produce additional methane. The product gas, which also contains excess hydrogen, leaves through line 76 and may be preheated in heat exchanger 77. The gas is then used as the conveying gas in the pyrolysis section of the plant. It leaves heat exchanger 77 through line 78 and its flow is split by valve 79 into streams 80 and 82.

The hot char passes through line 44 into the char superheater 84. In this unit the char is heated indirectly to a temperature of from 1000 to 1800° F. to evolve a hydrogen rich gas stream. The gaseous and solid products leave the superheater 84 through line 86 and pass to a solid-gas separator 88. The gas passes through line 90 and it can either be purified or sent directly to the hydrogen inlet line 53.

The degasified char passes through line 92 into char reactor 94, which is a unit for producing hydrogen by partial oxidation of the char with oxygen to produce carbon monoxide. The resultant carbon monoxide is reacted catalytically with steam to yield carbon dioxide and hydrogen. The carbon dioxide is then removed from the product gas stream by chemical absorption. The oxygen and water enter the system through lines 100 and 102, and the product hydrogen is passed through line 98 to line 53. The char residue exits through line 96.

EXAMPLE

A bituminous coal from West Kentucky is pulverized to −60 mesh, and fed at a rate of 100 lb. per hour into a 4-in. diameter, 15-ft. long reactor. The reaction heat is supplied by a recirculating char stream at a temperature of 1150° F. and a feed rate of 950 lb. per hr. The velocity in the reactor is maintained at 15 ft. per second by control of the recycle gas flow rate. The products leave the reactor at a temperature of 1000° F. and pass through a cyclone which removes essentially all the solids from the gas stream. The products from the pyrolysis reactor, based on a feed of 1 ton of dry coal, are as follows:

Water, 100 lb.
Condensible liquid, 750 lb.
Gas, 145 lb.

Ultimate analysis of condensable liquid

| | Wt. percent |
|---|---|
| C | 81.8 |
| H | 7.0 |
| O | 8.0 |
| N | 1.2 |
| S | 2.0 |

Analysis of product gas

| Component: | Volume, percent |
|---|---|
| $CH_4$ | 34.6 |
| $C_2H_6$ | 8.2 |
| $C_3H_8$ | 2.0 |
| $H_2$ | 26.9 |
| $H_2S$ | 18.1 |
| CO | 4.4 |
| $CO_2$ | 5.8 |

These products, which are maintained in the vapor phase, are immediately compressed in a four-stage compressor to a pressure of 1500 p.s.i.g. Cooling for the first two stages is obtained by passing the required hydrogen initially at 1500 p.s.i. and ambient temperature at a flow rate of 1300 cubic feet per hour through the exchangers. This heats the hydrogen to the reaction temperature of 900° F. to provide interstage cooling. The hydrogen and the compressed vapors enter the hydrogenation reactor which is a two-stage unit. In the first stage, the hydrogenation reaction is conducted at 900° F. using a cobalt molybdenate catalyst.

The reaction products then pass to the second stage where a destructive hydrogenation is conducted at 1300° F.

The reaction products are then cooled and purified using conventional technology, and the pipeline gas is recovered cryogenically. The yield per ton of coal is:

$CH_4$: 15,375 ft.³
$C_2H_6$: 1050 ft.³

The flow rate of non-condensable gases from the cryogenic separator is 68 ft.³/hr. and its composition is approximately 8.7% CO, and 91.3% $H_2$. This gas is then passed to a methanator for conversion of the CO to $CH_4$. These product gases are then used as the transport gas in the pyrolysis reactor.

What is claimed is:

1. A process for producing pipeline gas from carbonaceous material comprising:
   (a) comminuting the carbonaceous material until the particle size of said carbonaceous material has a maximum particulate dimension of less than 1.0 inch;
   (b) forming a turbulent gaseous stream comprised of a substantially non-oxidizing carrier gas, particulate carbonaceous solids, and particulate char such that the solids and char are intimately admixed and entrained within the gaseous portion of the stream;
   (c) heating the particulate carbonaceous solids in said stream to a temperature ranging between 600° F. and 1500° F. in a pyrolysis zone, the residence time of said waste solids in said zone being les than one minute;
   (d) separating the gaseous products and solids from said heated stream, said gaseous products containing volatilized hydrocarbons;
   (e) compressing said gaseous products to a pressure ranging between about 500 to about 1500 p.s.i.a. while maintaining the gaseous product in the gaseous state;
   (f) heating said compressed gaseous products to a temperature ranging from about 800° F. to about 1400° F.;
   (g) contacting said heated gaseous products with hydrogen to methanate the volatilized hydrocarbons contained in the gaseous products.

2. The process of claim 1 wherein heated char is utilized to provide at least a portion of the heat required to heat the carbonaceous material in the pyrolysis zone.

3. The process of claim 2 wherein said gaseous products are contacted with hydrogen in the presence of a hydrogenation catalyst.

4. The process of claim 3 wherein said hydrogenation catalyst is a catalyst selected from the group consisting of sulfides of cobalt-molybdenum oxides, nickel oxides and tungsten oxides.

5. The process of claim 2 wherein at least a portion of hydrogen utilized to methanate the volatilized hydrocarbons is obtained by heating a portion of the pyrolyzed solids in a degasification zone to a temperature ranging from about 1000° F. to about 1800° F. to form a hydrogen rich gas stream.

6. The process of claim 1 wherein at least a portion of the hydrogen utilized to methanate the volatilized hydrocarbons is obtained by partially oxidizing at least a portion of the char solids recovered from the pyrolysis zone by heating the char to a temperature ranging from about 1500° F. to about 2500° F. and contacting the char with steam at pressures ranging from about 300 to 600 p.s.i.a. to produce a synthesis gas stream consisting primarily of a gaseous mixture of carbon monoxide, carbon dioxide and hydrogen thereafter utilizing this synthesis gas as a source of hydrogen to convert the volatilized hydrocarbons to pipeline gas.

7. The process of claim 6 wherein the carbon monoxide gas contained in the synthesis gas is removed from the synthesis gas and is shifted to a mixture of carbon dioxide and hydrogen in a catalytic reactor by contacting the carbon monoxide with steam at temperatures ranging from 500° F. to 700° F. and pressures ranging from 200 to 400 p.s.i.a. and thereafter utilizing the mixture of carbon dioxide and hydrogen as a source of hydrogen to convert the volatilized hydrocarbons to pipeline gas.

8. The process of claim 2 wherein said carbonaceous solids are coal.

9. The process of claim 8 wherein said coal is agglomerative bituminous coal.

10. The process of claim 2 wherein said carbonaceous solids are waste solids.

11. The process of claim 1 wherein the inert carrier gas is a gas selected from the group consisting of hydrogen, carbon monoxide, methane and mixtures thereof.

12. The process of claim 2 wherein the char is heated by controlled combustion.

References Cited

UNITED STATES PATENTS

| | | | |
|---|---|---|---|
| 2,654,663 | 10/1953 | Gorin | 48—210 X |
| 2,840,462 | 6/1958 | Gorin | 48—197 |
| 3,347,647 | 10/1967 | Feldkirchner et al. | 48—197 |
| 3,503,724 | 3/1970 | Benson | 48—197 X |
| 3,556,749 | 1/1971 | Spacil | 48—210 X |

MORRIS O. WOLK, Primary Examiner

R. E. SERWIN, Assistant Examiner

U.S. Cl. X.R.

48—197 R; 252—373